O. E. BRAUN.
VEHICLE WHEEL LOCK.
APPLICATION FILED SEPT. 16, 1914.
1,141,100.
Patented June 1, 1915.
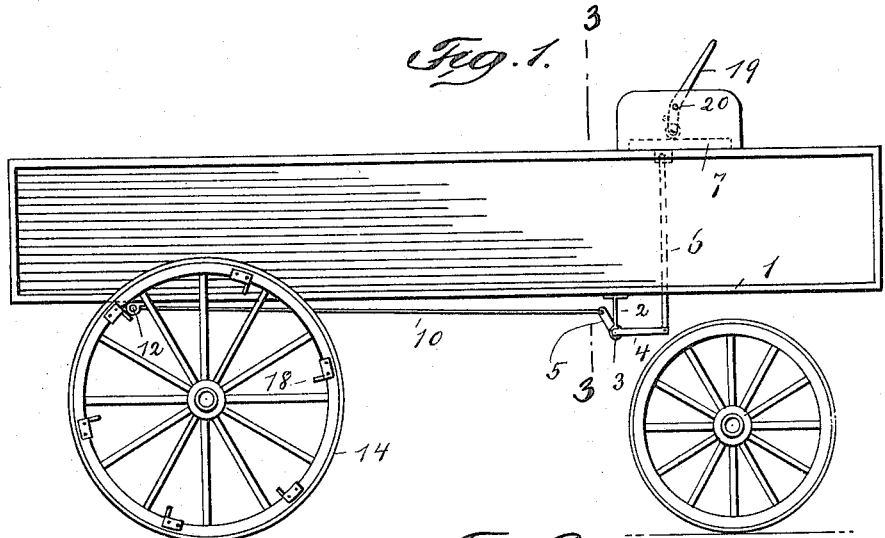
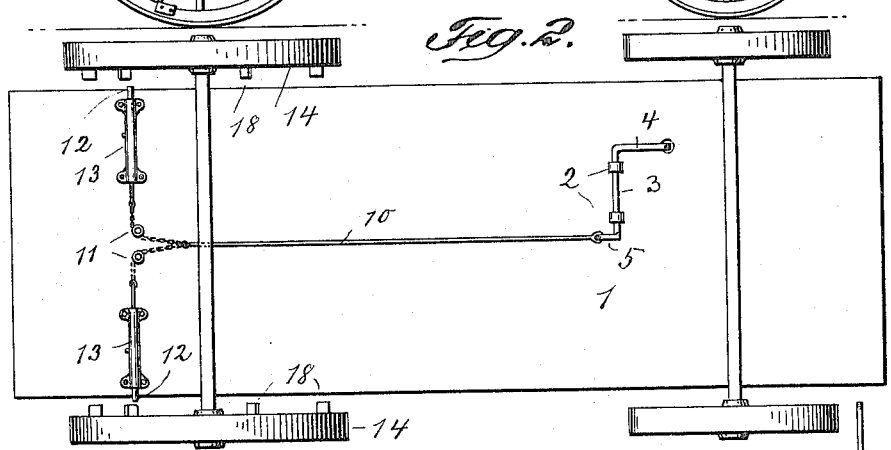
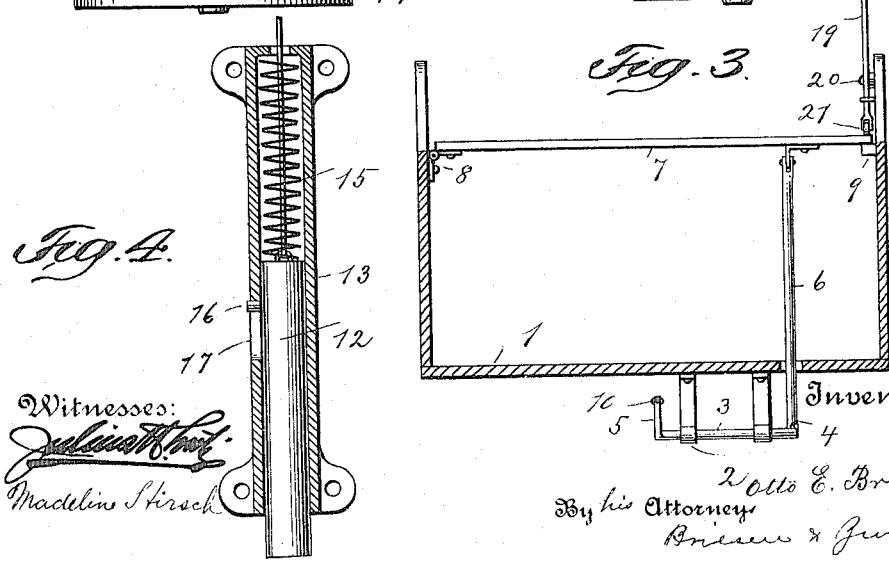
Witnesses:
Inventor
Otto E. Braun
By his Attorney

UNITED STATES PATENT OFFICE.

OTTO E. BRAUN, OF BROOKLYN, NEW YORK.

VEHICLE WHEEL-LOCK.

1,141,100.  Specification of Letters Patent.  Patented June 1, 1915.

Application filed September 16, 1914. Serial No. 862,093.

*To all whom it may concern:*

Be it known that I, OTTO E. BRAUN, a citizen of the United States, and a resident of Brooklyn, in the county of Kings and State of New York, have invented certain new and useful Improvements in Vehicle Wheel-Locks, of which the following is a specification.

This invention relates to a wheel lock which is operably secured to a movable driver's seat, in such a manner than when the seat is occupied, the wheel will become unlocked, while when the seat is vacated, the wheel will become locked. Thus as the driver steps off the vehicle, the lock will become automatically effective, while when he resumes his seat, the locking mechanism will be automatically withdrawn, so that in this way any physical labor on the part of the driver for the purpose of guarding the vehicle against runaway accidents is entirely obviated.

The invention also embraces the various other features of improvement more fully pointed out in the specification and appended claim.

In the accompanying drawing: Figure 1 is a side elevation of a vehicle provided with a wheel lock embodying my invention; Fig. 2 a bottom view thereof; Fig. 3 a section on line 3—3, Fig. 1, and Fig. 4 a detail of the locking means proper.

From the bottom 1 of the vehicle body, there depends a pair of bearings 2, in which is hung a rock shaft 3, having a pair of crank arms 4 and 5, that extend from said shaft in different directions. To the forwardly extending arm 4, there is pivoted the lower end of a rod 6, that extends upwardly through an aperture of bottom 1, and is pivoted at its upper end to a tiltable driver's seat 7. This seat is hinged at one end to one of the longitudinal sides of the wagon body as at 8, while its other end is in its depressed or horizontal position adapted to be supported upon a ledge 9 carried by the other side. The correlation of the parts is such that rod 6 is connected to seat 7 in proximity to the free end of the latter, so that upon the downward movement of this free end, a stroke of substantial length will be imparted to the rod, to cause a corresponding axial movement of rock shaft 3.

The rearwardly extending arm 5 of shaft 3 is connected by a pair of cables 10, running over pulleys 11, to a pair of bolts 12, which are housed in tubular casings 13. These casings are secured to bottom 1, opposite each of the rear wheels 14, though if desired, a single cable operating on a single bolt may of course be employed. Within the inner end of casing 13 there is accommodated an expansion spring 15, which is coiled around the cable, and has a tendency to shoot the bolt, and in consequence thereof to exercise a pull on the cable. In order to check the play of the bolt the latter is provided with a pin 16, engaging a longitudinal slot 17 of casing 13. To the rim of each rear wheel 14, there are secured a plurality of stops 18, which are set back from the tread, and extend inwardly a distance from the rim, these stops being arranged in the path of bolt 12 the correlation of the parts being such that while the play of pin 16 in slot 17 permits the engagement of bolt 12 with stops 18, it prevents the bolt from advancing into engagement with the wheel-spokes.

As thus far described the device operates as follows: When the seat is occupied by the driver, his weight will cause the seat to turn on hinge 8, until it settles in a horizontal position on ledge 9. By this movement rod 6 will be depressed to turn shaft 3, and thus cause the latter by cables 10 to retract bolts 12 against the action of springs 15, so that the bolts will clear stops 18 and thus unlock wheels 14. When the driver rises from seat 7, springs 15, will shoot bolts 12 into engagement with stops 18, so that wheels 14 become automatically locked. At the same time, the outward movement of the bolts will cause the latter to exert a pull on cables 10 by means of which shaft 3 is so rocked that rod 6 is raised, and seat 7 is tilted upward off ledge 9. In this way the seat again becomes so positioned that it will be ready to be depressed upon being again occupied.

In order to permit the driver to throw the entire locking mechanism out of action, there is fulcrumed to the side of the wagon body opposite the free end of the seat, a hand lever 19 turning on a fulcrum 20. This hand lever has a forked, lower end in which is hung a roller 21, moving in a vertical plane above the free end of the seat. When the hand lever is thrown forward, the roller will be swung backward and downwardly to depress the seat and hold it immovably upon ledge 9. When the hand lever is thrown back, the roller will be swung upward and forward to release the seat, and again subject it to the action of springs 15. In this way the driver can stay the operation of the lock, whenever he so desires which may be necessary in case he wishes to leave his seat without desiring to stop the vehicle, and for other purposes.

I claim:

In a vehicle wheel lock, a vehicle body having a pair of longitudinal sides, a tiltable seat hinged to one of said sides, seat-supporting means on the other side, a crank-shaft journaled to the vehicle bottom, a pivoted rod connecting the seat to said crank-shaft, a casing likewise secured to the vehicle bottom a spring-influenced bolt housed within the casing, a cable connecting the crank-shaft to the bolt, a vehicle wheel having a stop that is set inwardly from the wheel rim and is adapted to be engaged by the bolt, and means for limiting the play of the bolt.

OTTO E. BRAUN.

Witnesses:
 FRANK V. BRIESEN,
 MADELINE HIRSCH.

Copies of this patent may be obtained for five cents each, by addressing the " Commissioner of Patents, Washington, D. C."